United States Patent [19]

Futakata

[11] Patent Number: 4,896,147
[45] Date of Patent: Jan. 23, 1990

[54] DISPLAY DEVICE FOR DISPLAYING CHARACTERS OF DIFFERENT CHARACTER SIZES

[75] Inventor: Takashi Futakata, Shizuoka, Japan

[73] Assignee: Tokyo Electric Co., Ltd., Tokyo, Japan

[21] Appl. No.: 90,031

[22] Filed: Aug. 27, 1987

[30] Foreign Application Priority Data

Sep. 10, 1986 [JP] Japan .................................. 61-213565

[51] Int. Cl.[4] .............................................. G09G 1/06
[52] U.S. Cl. .................................................... 340/731
[58] Field of Search ............... 340/731, 735, 749, 790; 364/518, 519

[56] References Cited

U.S. PATENT DOCUMENTS

| | | | |
|---|---|---|---|
| 4,314,244 | 2/1982 | Demke et al. | 340/731 |
| 4,447,888 | 5/1984 | Kuecker et al. | 340/731 |
| 4,455,554 | 6/1984 | Demke | 340/731 |
| 4,511,267 | 4/1985 | Porkorny et al. | 340/731 |

FOREIGN PATENT DOCUMENTS 51-82521 7/1976 Japan .

Primary Examiner—Gerald Brigance
Assistant Examiner—Richard Hjerpe
Attorney, Agent, or Firm—Frishauf, Holtz, Goodman & Woodward

[57] ABSTRACT

A display device comprises a memory for storing article name data first and second character generators, a display unit, and a control unit. The character generators respectively generate character data of a normal character size and also of a character size smaller than the normal character size. The control unit detects the number of characters of the article name data stored in the memory, causing the character generators to generate character data, according to the stored article name data, of the smaller character size or of the normal character size, depending on whether the detected number of characters is greater or less than a predetermined value. The generated character data is displayed on the display unit.

5 Claims, 5 Drawing Sheets

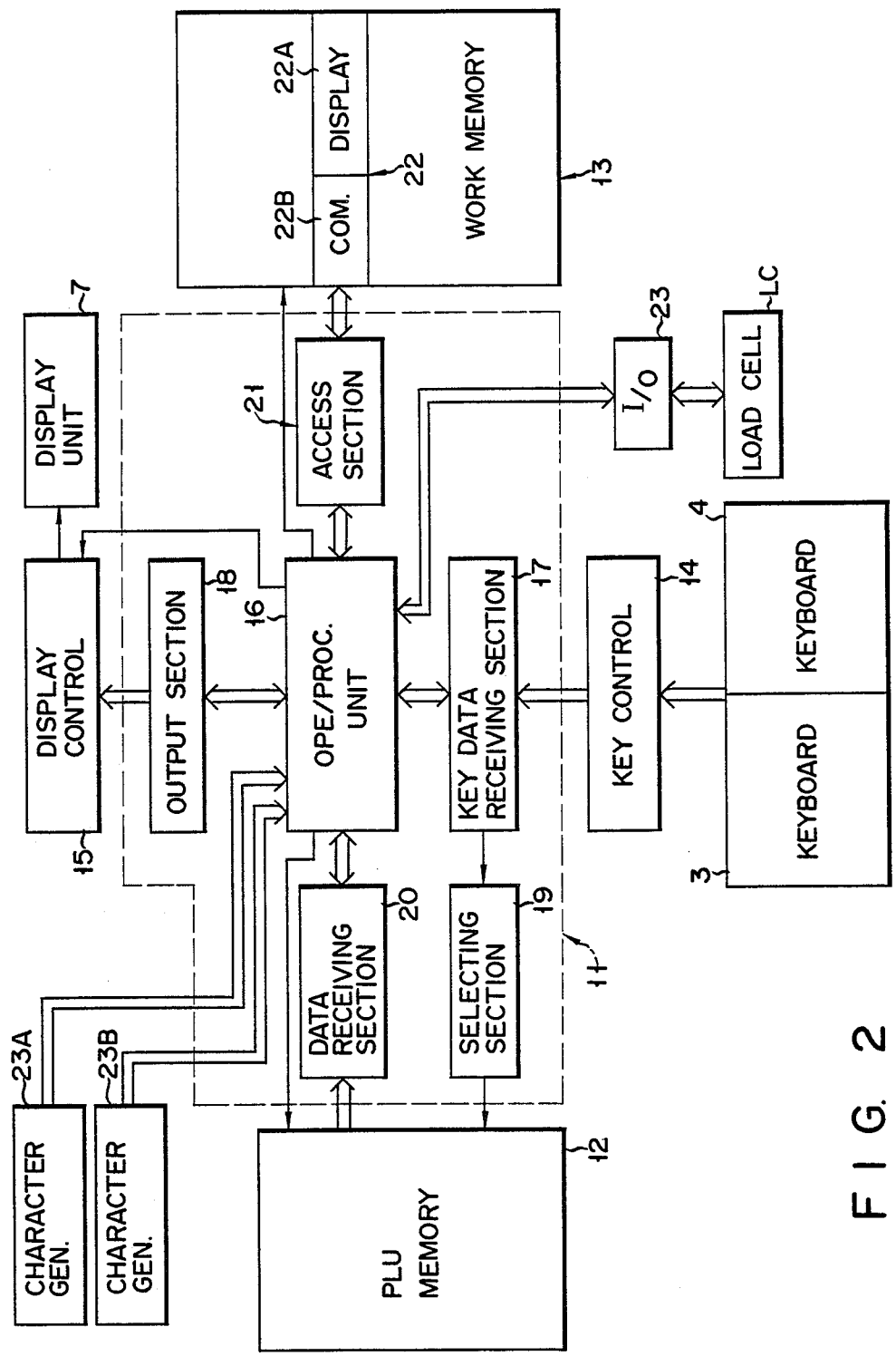
F I G. 2

DISPLAY DEVICE FOR DISPLAYING CHARACTERS OF DIFFERENT CHARACTER SIZES

BACKGROUND OF THE INVENTION

The present invention relates to an electronic weighing apparatus which can display an article name on an article name display unit.

As is usual with this type of a conventional electronic weighing apparatus, the names of various kinds of articles are stored together with their unit prices, etc. in a PLU (Price Look-Up) memory, and when in an ordinary label issuing mode, data such as an article name is provided by calling up the associated PLU by means of its PLU article number. When such a PLU call-up is performed, in order to determine accurately whether or not the called-up article name is the actual one desired, the article name is displayed, for visual confirmation, on the article name display unit. The size of characters displayed on the display unit is fixed, being of a standard size.

With regard to the article names stored in the PLU memory, however, although the article names are limited in the number of characters displayable, some names may be very long and some very short, within the number limit. Therefore, when the displayable character size is set large, as in the case of the conventional electronic weighing apparatus, it may then not be possible to display a very long article name in its entirety; there would be a partial cut-off of the name on the display. On the other hand, when the displayable character size is set small, a long article name can be displayed in its entirety, but a very short article name would be displayed on the left side of the display unit, resulting in an imbalanced display. With a view to solving this problem, it is considered to set long article names in the PLU memory in abbreviated form; however, this entails the performing of a rather cumbersome operation.

SUMMARY OF THE INVENTION

It is accordingly an object of this invention to provide a display device for use in an electronic weighing apparatus, which permits the setting of different character sizes, according to the number of characters to be displayed, so that characters can always be displayed in a well-balanced style.

This object can be realized by the provision of a display device which comprises a memory for storing article name data, first and second character generators for respectively generating character data of a normal, i.e. standard, character size and of a character size smaller than the normal size, a display unit, and a control unit for detecting the number of characters of the article name data stored in the memory, for causing a respective character generators to generate character data, according to the stored article name data, of the smaller character size or of the normal character size, depending on whether or not the detected number of characters falls within a predetermined range, and displaying the generated character data on the display unit.

BRIEF DESCRIPTION OF THE DRAWINGS

FIG. 2 is a circuit diagram of a control unit of the electronic weighing apparatus shown in FIG. 1;

DETAILED DESCRIPTION OF THE PREFERRED EMBODIMENT

An embodiment of this invention will now be explained, with reference to the accompanying drawings.

Figure 1:
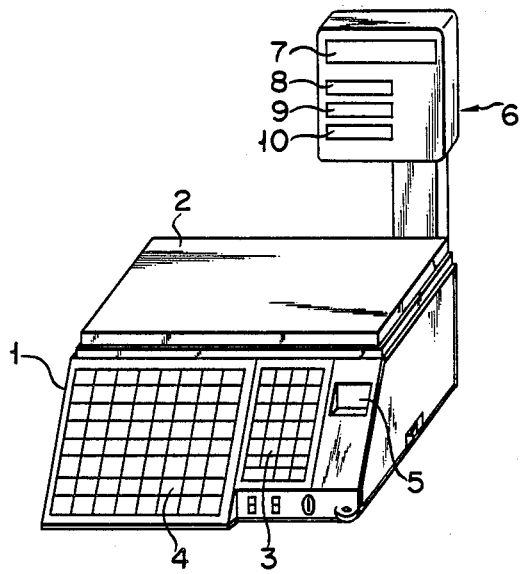
FIG. 1 is a perspective view of an electronic weighing apparatus with a display device according to an embodiment of this invention.

The outline of an electronic weighing apparatus with the display device according to this embodiment is illustrated in FIG. 1. The weighing apparatus comprises a weighing saucer 2 on which an article to be weighed is placed, and a front panel which includes panel keys 3, direct keys 4, as well as other keys, and a label issuing slot 5. The weighing apparatus includes a display unit 6 which extends upwards on the rear right portion. Display unit 6 has an article name display section 7 at the front top, and below section 7, three more display sections: a weight display section 8, a unit price display section 9, and a price display section 10, each of a seven-segment type for numeral display.

FIG. 2 is a block diagram of an electric control circuit of the weighing apparatus. This control circuit comprises CPU 11, PLU memory 12, and working memory 13, the latter two memories being to CPU 11. The aforementioned panel keyboard 3 and direct keyboard 4 are also coupled to CPU 11 via key controller 14, while article name display section 7 is coupled to CPU 11 via display controller 15. CPU 11 has an operation/processing unit 16, which constitutes a character number detection means, as well as key data receiving section 17, and data output section 18. Key data receiving section 17 receives key data via key controller 14, and data output section 18 supplies display data to display controller 15. PLU memory 12 is coupled to selecting section 19, which searches for any requested PLU file, and to data receiving section 20, which receives data from PLU memory 12. Working memory 13 is coupled to memory access section 21. CPU 11 is further coupled via an I/10 port 22 to load cell LC, which supplies weight data to the CPU.

With the above arrangement, when keyboard 3 or 4 is operated to call a PLU data in a normal label issuing mode, the PLU code specified by the key operation is transferred via key controller 14 to key data receiving section 17 in CPU 11. Operation/processing unit 16 recognizes the PLU code supplied from key data receiving section 17, and searches for the associated PLU file in PLU memory 12 via selecting section 19. Upon retrieval of the associated PLU file, operation/processing unit 16 generates a read signal to PLU memory 12, whereby PLU file data such as an article name is read out from the PLU file to data receiving section 20. Then, operation/processing unit 16 extracts article name data from the received data and stores it in display data section 22A of display buffer 22 of working memory 13 via memory access section 21. Display buffer 22, which serves as a means for changing the display character size, also includes command section 22B for storing a command relating to the display character size. As will be described later, a command specifying the display character size, corresponding to the checked article name, is stored, by operation/processing unit 16, in command section 22B of display buffer 22 via memory access section 21.

The command and display data stored in the above manner in display buffer 22 are output, by the control signal from operation/processing unit 16, to data output section 18 via access section 21, and are then transferred in the form of a command train to display controller 15. Upon receipt of a display request signal from operation/processing unit 16, display controller 15 displays on display section 7 the article name with the character size specified by the character size command included in the command train.

The circuit for generating characters for article name display, according to this embodiment, comprises normal-size character generator 23A and small-size character generator 23B. Each normal-size character is generated in the form of 16 dots×8 dots, for example, the former being the vertical axis, the latter the horizontal axis. The normal character size ensures a display of 14 characters in a line on article name display section 7. Each small-size character is, for example, 7 dots×5 dots, the former being the vertical axis, the latter the horizontal axis. Which of the character generators, 23A or 23B, is to be used for article name display is determined by the character size command stored in command section 22B of display buffer 22.

The operation sequence in which operation/processing unit 16 retrieves the PLU file, checks the article name, and sends it as a command train to display controller 15, will be explained below with reference to the flowcharts of FIGS. 3 and 4.

Figure 3:
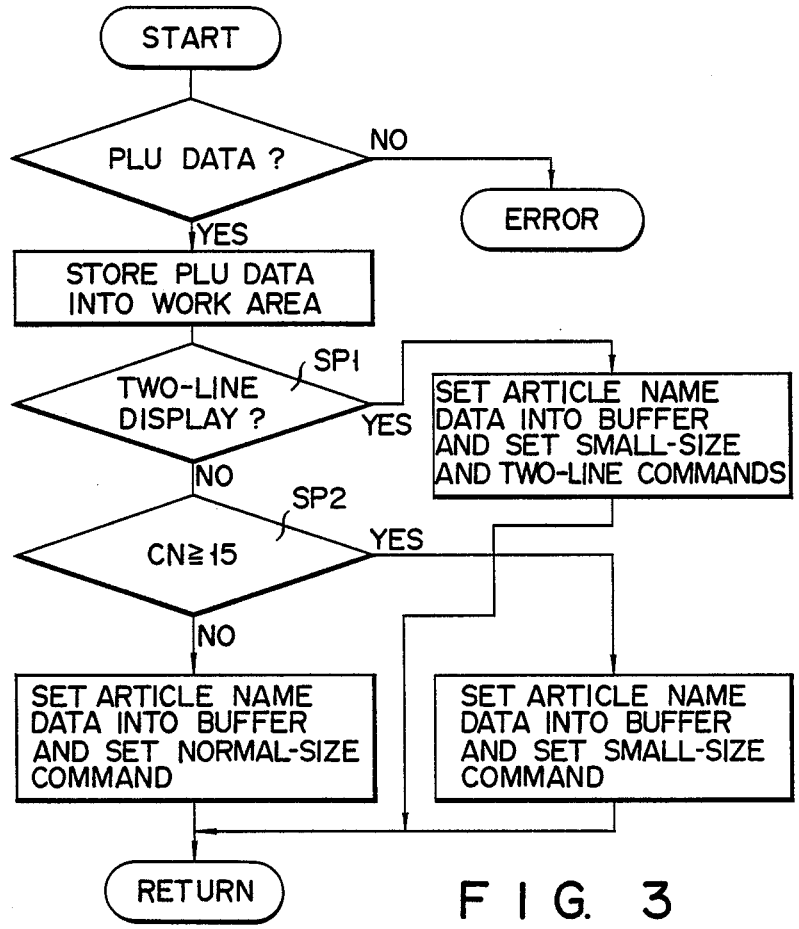
FIGS. 3 to 5 are flowcharts for explaining the operation of the control unit of FIG. 2.

First, in the PLU calling process shown in FIG. 3, if no PLU is found which corresponds to the key data, CPU 11 determines that the called PLU is not registered, thus resulting in an error. If a PLU is found which corresponds to the key data, the file is retrieved, and the article name data of the PLU data is loaded into warking memory 13, where it undergoes a checking operation. More specifically, after it is detected, in step SP1, that the article name is not arranged in two lines, the number of characters in the article name is checked in the subsequent step, SP2. Since the maximum number of characters displayable on display section 7, for the normal character size of 16×8 dots, is 14, for example, it is checked, in step SP2, whether or not the article name to be displayed contains more than 14 characters. As was mentioned earlier, therefore, operation/processing unit 16 serves as a character number detecting means.

Figure 4:
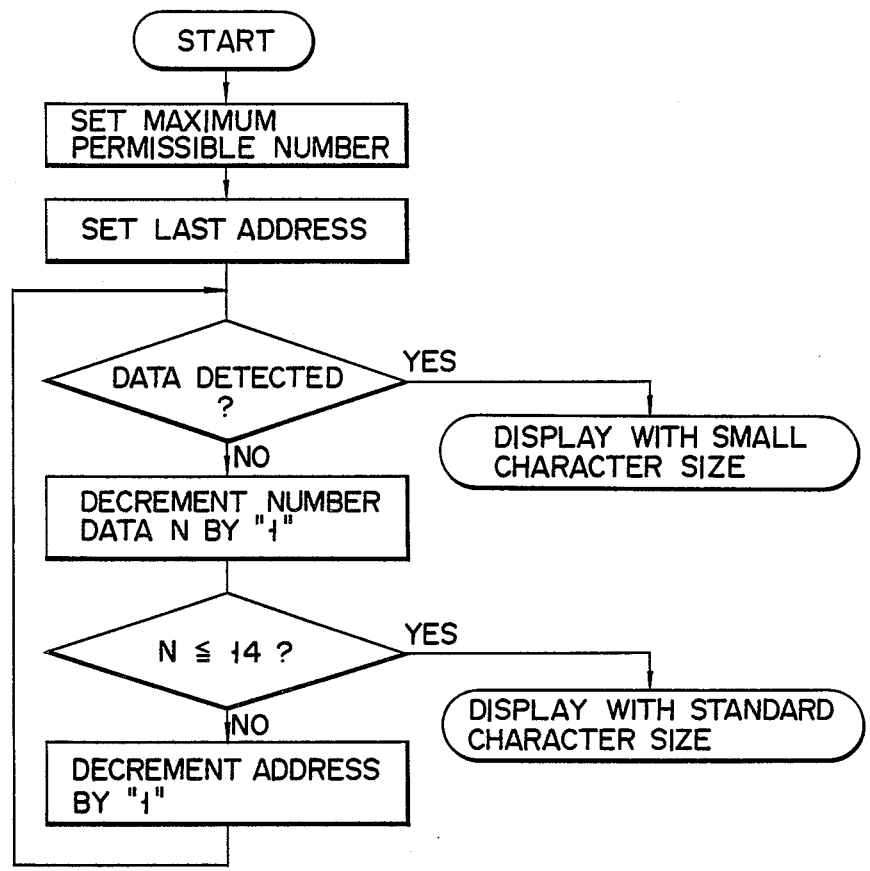

The operation of checking the number of characters in the article name is executed according to the flowchart of FIG. 4. First, after the maximum number of the characters is set in working memory 13, the address in display data section 22A which corresponds to the position of the last character data is set. Then, it is checked to determine whether or not character data is detected exists at the last address; If character data is detected at the designated address, it is then determined that the character data cannot be displayed in its entirety, at the normal character size. In other wourds, the determination is "YES", in step SP2 of the operation outlined in the flowchart of FIG. 3. If no character data is detected at the last address, the maximum character number is then decremented by one. If character data is detected before the decreased number becomes equal to or less than 14, the article name is then determined as being made up of 15 or more characters, meaning that the article name cannot be displayed at the normal character size. This means "YES", in step SP2. If character data is not found until the decreased number becomes 14 or less, it is then determined that the data can be displayed at the normal character size ("NO" in step SP2).

Figure 6A:
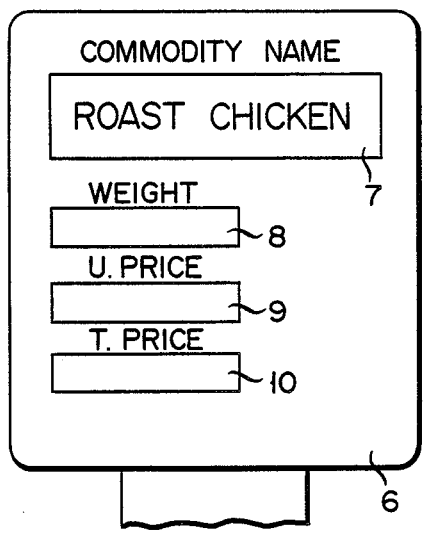
FIGS. 6A to 6C illustrate examples of character data displayed in a normal character size, in a small character size, and in the small character size with a two-line layout, respectively.
Figure 6C:
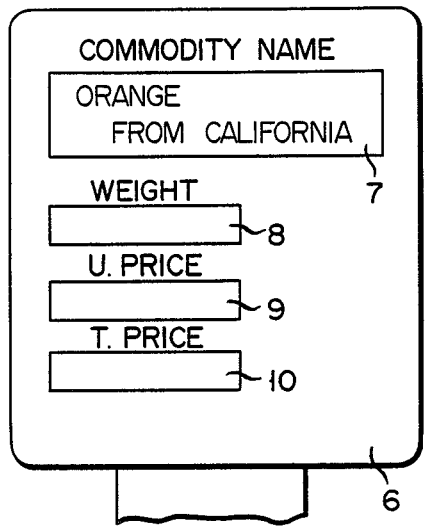
Figure 6B:
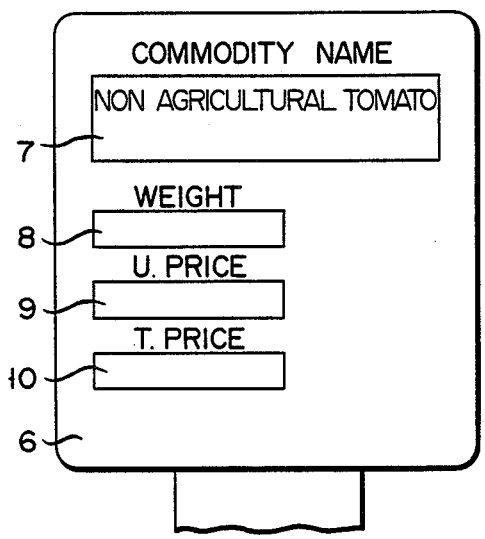

When the number of characters making up the article name is detected to be 14 or less ("NO" in step SP2), the article name data is set in display data section 22A of display buffer 22, and the command to specify the display character size is set in command section 22B. Accordingly, display controller 15 causes display unit 7 to display the article name data in the normal character size, as produced by character generator 23A, in response to the command. This would be the case, for example, if the article name is "ROAST CHICKEN" (13 characters), as is shown in FIG. 6A. On the other hand, if the decision in step SP2 is "YES," which means the number of characters making up the article name is 15 or greater, the article name data is set in display section 22A of display buffer 22, and the command to specify the character size smaller than the normal character size is set in command section 22B. Accordingly, display controller 15 causes display unit 7 to display the article name data at the small character size, as produced by character generator 23B, in response to the command. This would be the case, for example, if the article name is "NON AGRICULTURAL TOMATO" (23 characters), as is shown in FIG. 6B. In other words, the display character size is 16×8 dots, in the case of FIG. 6A, while it is 7×5 dots, in the case of FIG. 6B, so that even a long article name which cannot be displayed at the normal character size can be displayed at the small character size in a line on display section 7.

The article name may be accompanied, for example, by the name of the place of manufacture and may therefore be arranged in two lines. According to this embodiment, such character data can be displayed on two lines, at the small character size. This will now be explained in more detail.

Figure 5:
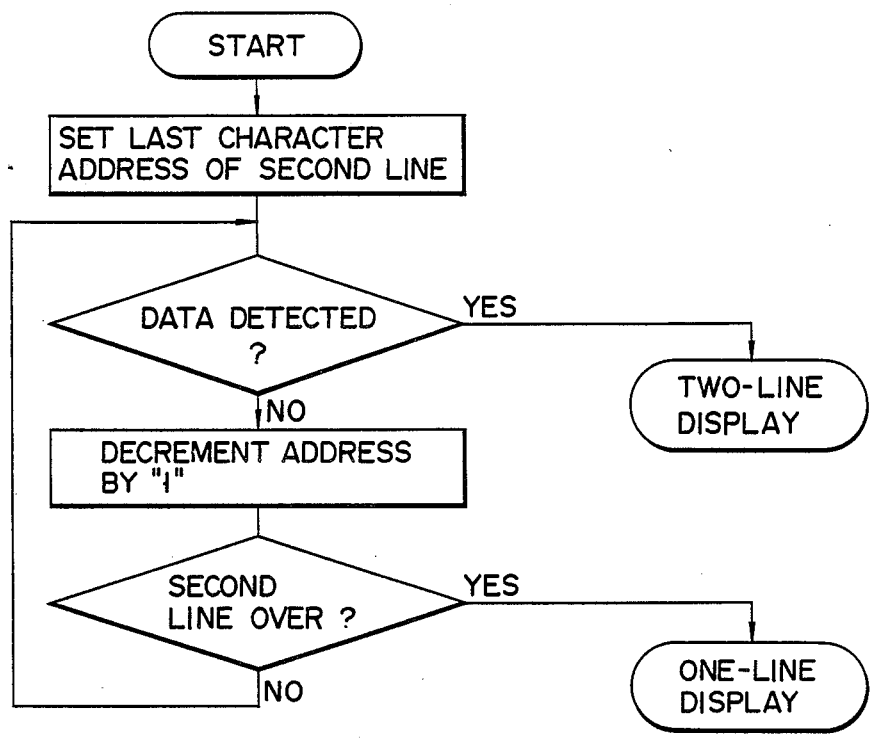

When the article name is stored in two lines in PLU memory 12, both lines cannot be displayed simultaneously at the normal character size; only one of the two lines is displayable at this size. To cope with this problem, therefore, this embodiment ensures that in addition to the aforementioned character number checking, a check is performed in step SP1, to determine whether the article name is arranged on one line or two lines. This additional checking operation is executed as follows, according to the flowchart shown in FIG. 5.

The last character address within the possible second line's data area is set, so that if character data is contained at this address, it is determined that the article name takes the two-line form. If there is no character data at the last address but is found to be at an address between the last address and the address of the first character of the second line, it is still determined that the article name takes the two-line form. In other cases, it is determined that the article name takes the one-line form.

If the article name is detected to take the two-line layout, as shown in FIG. 3, the article name data is set in display section 22A of display buffer 22, and the command for specifying the small character size (as is the case when the character number is greater than 14) is set in command section 22B. In this case, unlike in the case where the character number is greater than 14, the command for specifying the two-line layout display is also set in command section 22B. Accordingly, display controller 15 causes display unit 7 to display the article name data in two lines, at the small character size, in response to the commands (which specify the small character size and the two-line layout display). This would be the case, for example, if the article name is "ORANGE FROM CALIFORNIA", arranged in two lines, as is shown in FIG. 6C. In other words, the character data has the 16×8 dot size, in the case of FIG. 6A, while it has the 7×5 dot size and takes the two-line layout, in the case of FIG. 6C, so that even a long article name which cannot be displayed at the normal character size can be displayed in two lines on display section 7.

As has been described above, according to this embodiment, an article name having a smaller number of characters is displayed at the normal character size, for easier visual confirmation, while an article name having a greater number of characters is displayed in its entirety, although in the small character size, in either one line or two lines. In the latter case, even though the characters to be displayed become smaller in size, the article name can thus still be displayed in its entirety. The size of the display character is selected depending on the number of characters making up the article name. Therefore, even a long article name can be properly registered in the PLU memory, as desired, without the need to use an abbreviation thereof.

According to this invention, the number of characters making up the article name called from the PLU file is first of all detected, so that if the character number of characters is greater than that which can be displayed at the normal character size, the second character generator (23B) is then selected, by the display character size-changing means, so as to display the article name instead at the small character size. Therefore, an article name having a smaller number of characters is displayed in the normal character size, for easier visual confirmation, while an article name having a greater number of characters is still displayed in its entirety, but at the small character size.

Although this invention has been explained with reference to one particular embodiment, it is not limited thereto. For instance, the display device of this invention may be used for an electronic cash register, as well as for an electronic weighing apparatus. Further, in the embodiment, one-line or two-line display is determined according as whether the number of characters to be displayed is 14 or less. However, the number of characters used as a circical valve is not limited to 14, but can be set to a different number, for example, 22.

What is claimed is:

1. A display device comprising:
    memory means for storing article name data;
    a first character generator for generating character data of a normal size;
    a second character generator for generating character data of a small size relative to said normal size, the height of which is less than half of that of the character data of said normal size, and the width of which is less than that of the character data of said normal size; and
    control means for causing said display means to display character data, said control means including means for checking the arrangement of characters of the article name data stored in said memory means and the number of characters of said article name data; means for selecting one of said first and second character generators, wherein said first character generator is selected when it is detected that the number of characters of said article name data lies within a predetermined range, and said second character generator is selected when it is detected that the number of characters of said article name data exceeds said predetermined range or when it is detected that the arrangement of said article name data is in two-line form; and means for causing the selected character generator to generate items of character data according to the characters of said article name data for causing the display means to display the generated character data.

2. A display device according to claim 1, wherein said control means further includes command-storing means for storing therein character size data indicating whether or not the number of characters of the article name data stored in said memory means lies within said predetermined range.

3. A display device according to claim 1, wherein said control means further includes command-storing means for storing therein small-character-size command data, when it is detected that the number of characters of the article name data stored in said memory means exceeds said predetermined range or when it is detected that the article name data stored in said memory means is arranged in two-line form.

4. A display device according to claim 2, wherein said control means further includes a control circuit coupled to said command-storing means for controlling storing of said character size data in said command-storing means.

5. A display device according to claim 3, wherein said control means further includes a control circuit coupled to said command-storing means for controlling storing of said small-character-size command data in said command-storing means.

* * * * *